United States Patent Office 2,910,485
Patented Oct. 27, 1959

2,910,485

METHOD OF PREPARING 17-ETHYL-EPI-TESTOSTERONE

George Rosenkranz, Mexico City, Mexico, and Franz Sondheimer, Rehovoth, Israel, assignors to Syntex S.A., Mexico City, Mexico, a corporation of Mexico No Drawing. Application May 11, 1956
Serial No. 584,177

Claims priority, application Mexico May 20, 1955

1 Claim. (Cl. 260—397.4)

The present invention relates to a novel cyclopentanophenanthrene compound and to a process for the production thereof.

More particularly, the present invention relates to the novel androgenic hormone 17-ethyl-epi-testosterone ($\Delta^4$-pregnen-17$\alpha$-ol-3-one) and to a process for the production thereof.

17-ethyl - epi - testosterone ($\Delta^4$ - pregnen - 17$\alpha$ - ol - 3-one) which possesses the 3-keto-17$\alpha$-hydroxy-$\Delta^4$-pregnene system in which the important hormones cortisone and hydrocortisone are included (as oxygenated derivatives having additional oxygen at positions 11, 20 and 21) has been found to be an important androgenic hormone having androgenic and anabolic activity.

It has been found in accordance with the present invention that the novel androgenic hormone 17-ethyl-epi-testosterone could be prepared by a novel process from 17$\alpha$,20-oxido-$\Delta^4$-pregnen-3-one, a compound previously described though not identified by Ruzicka et al., Helv. Chim. Acta., 22, 1294 (1939). Starting with the compound 17$\alpha$,20-oxido-$\Delta^4$-pregnen-3-one, it has been found that treatment with lithium aluminum hydride under vigorous conditions produces a mixture of the isomers $\Delta^4$-pregnen-3$\beta$,17$\alpha$-diol and $\Delta^4$ - pregnen - 3$\alpha$,17$\alpha$ - diol, without any simultaneous hydroxylation at C-20. Thereafter, in accordance with the present invention, the mixture of isomeric diols can be oxidized selectively with manganese dioxide to give the novel androgenic hormone 17-ethyl-epitestosterone.

The following equation serves to illustrate the present invention.

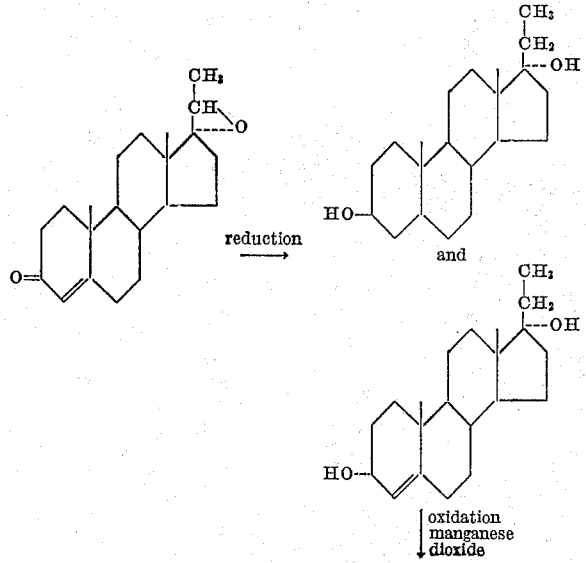

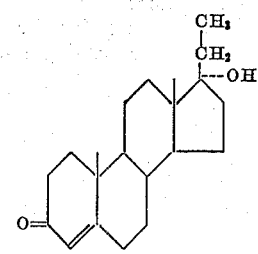

Referring to the above equation 17$\alpha$,20-oxido-$\Delta^4$-pregnen-3-one is dissolved in a suitable solvent, as for example dioxane, and is thereafter added to a solution of lithium aluminum hydride in ether. The mixture is then refluxed for a substantial period of time, as for example eight hours. Purification and evaporation of the solvent produced a mixture of $\Delta^4$-pregnen-3$\beta$,17$\alpha$-diol and $\Delta^4$-pregnen-3$\alpha$,17$\alpha$-diol as indicated in the above equation. The mixture of diols without purification was then dissolved in a suitable organic solvent such as chloroform and then stirred for a substantial period of time, preferably at room temperature, with manganese dioxide. Purification, evaporation of the solvent and crystallization of the residue from the mixture of solvents, such as acetone hexane, then yielded the desired 17-ethyl-epi-testosterone ($\Delta^4$-pregnen-17$\alpha$-ol-3-one).

The following specific examples serve to illustrate but are not intended to limit the invention:

EXAMPLE I

*17$\alpha$,20-oxido-$\Delta^4$-pregnen-3-one*

A solution of 2 g. of $\Delta^{4,17(20)}$-pregnadien-3-one (melting point 136°–138° C.) in 10 cc. of chloroform was oxidized by the portionwise addition of 16 cc. of a chloroform solution containing 0.9 equivalent of perbenzoic acid. The reaction was exothermic and the temperature of the solution was kept at 15°–20° C. during the addition by ice-cooling. After being allowed to stand at room temperature overnight, the solution was diluted with chloroform and washed with water and sodium carbonate solution. Drying, evaporation and crystallization of the solid residue from ether-hexane furnished 1.28 g. (61%) of the oxide with a melting point of 179°–184° C. (Kofler). A further purified sample showed a melting point of 184°–185° C. (Kofler), $[\alpha]_D$ +110°, $\lambda$ max. 240 m$\mu$, log $\epsilon$ 4,23, $\nu$ max. 1660 cm.$^{-1}$; reported by Ruzicka et al., for isomer B: melting point 188.5–190° C., $[\alpha]_D$ +106°.

EXAMPLE II

A solution of 0.7 g. of 17$\alpha$,20-oxido-$\Delta^4$-pregnen-3-one in 90 cc. of dioxane previously distilled over sodium was slowly added to a solution of 1 g. of lithium aluminum hydride in 50 cc. of dry ether. The mixture was distilled to remove most of the ether and then refluxed for eight hours. Ethyl acetate was added to decompose the excess of hydride and then a concentrated solution of sodium sulfate was added until the precipitate started to stick at the walls of the flask. Solid sodium sulfate was finally added and the salts were filtered and washed with tetrahydrofurane. Evaporation of the solvent afforded the mixture of $\Delta^4$-pregnen-3$\beta$,17$\alpha$-diol and $\Delta^4$-pregnen-3$\alpha$,17$\alpha$-diol which was not purified. It was dissolved in 60 cc. of chloroform and stirred at room temperature for sixteen hours with 3.5 g. of manganese dioxide, at the end of which time an additional 3.5 g. of manganese dioxide was added and the stirring continued for a further sixteen hours. The solid was filtered and well washed with hot chloroform. Evaporation of the solvent and crystallization of the residue from acetone-hexane yielded 0.51 g. (72%) of 17-ethyl-epi-testosterone ($\Delta^4$-pregnen-17α-ol-3-one) with a melting point of 145°–148° C. The analytical sample had a melting point of 152°–153° C. (Kofler), $[\alpha]_D$ +81° (chloroform).

We claim:

The process for the preparation of 17-ethyl-epi-testosterone comprising reducing 17α,20-oxido-$\Delta^4$-pregnen-3-one with lithium aluminum hydride and thereafter oxidizing the resulting mixture of isomeric diols with manganese dioxide.

References Cited in the file of this patent

UNITED STATES PATENTS

| | | |
|---|---|---|
| 2,334,695 | Butenandt | Nov. 23, 1943 |
| 2,374,369 | Miescher | Apr. 24, 1945 |
| 2,739,974 | Colton | Mar. 27, 1956 |